May 25, 1926.  1,586,507
J. BERG
VISOR
Filed April 21, 1923   2 Sheets-Sheet 1
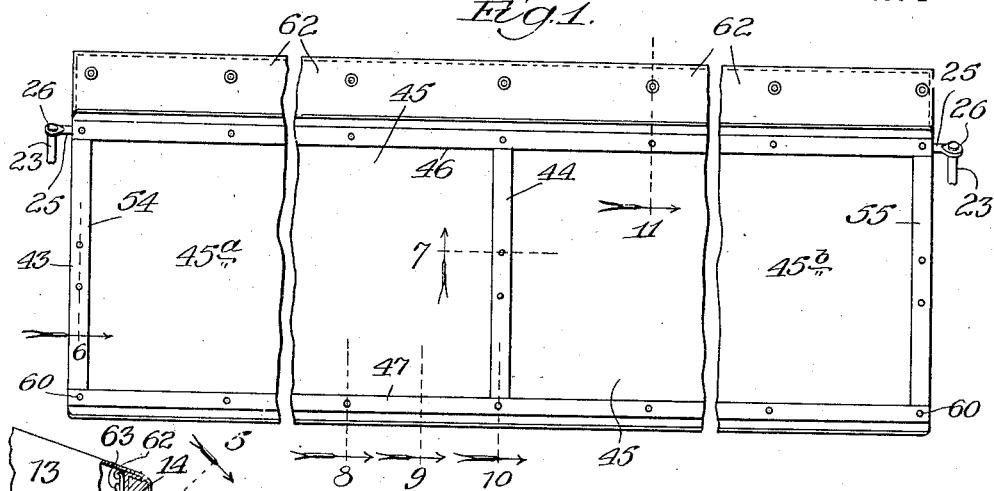
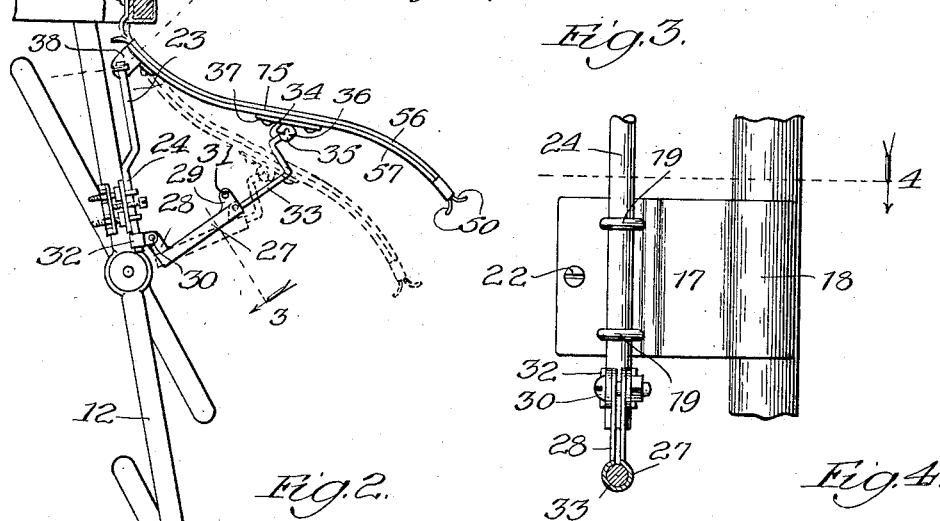
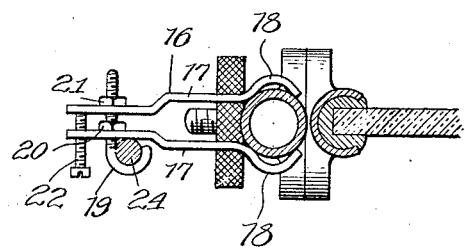
Inventor:
John Berg,
By Dyrenforth, Lee, Chritton & Wiles,
Att'ys

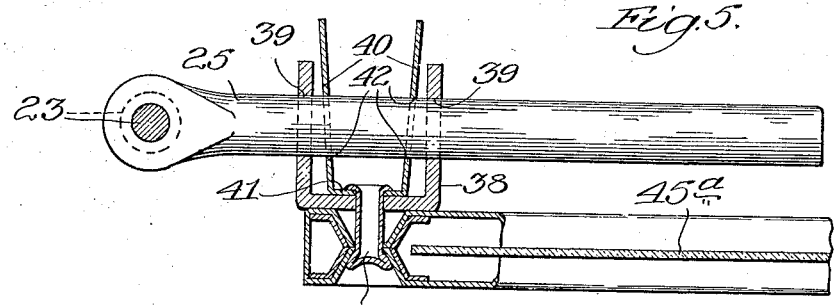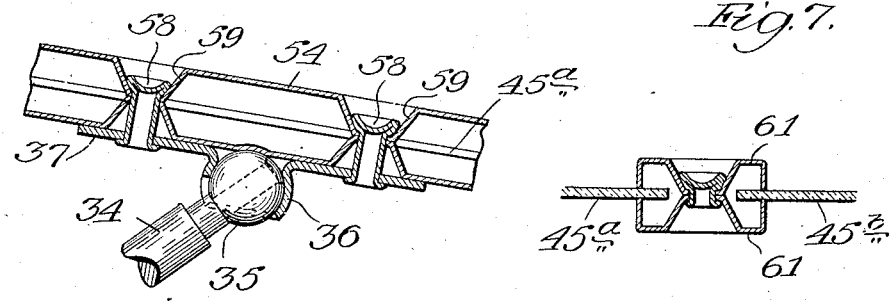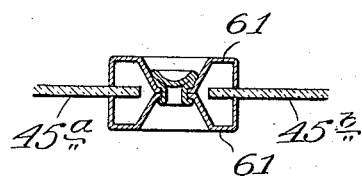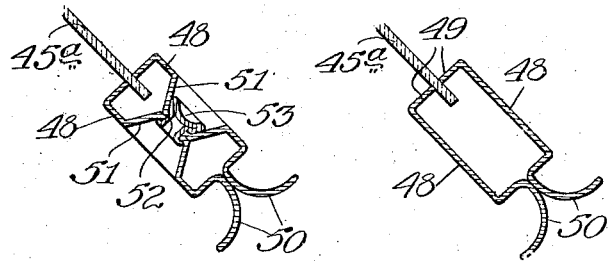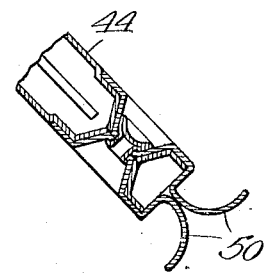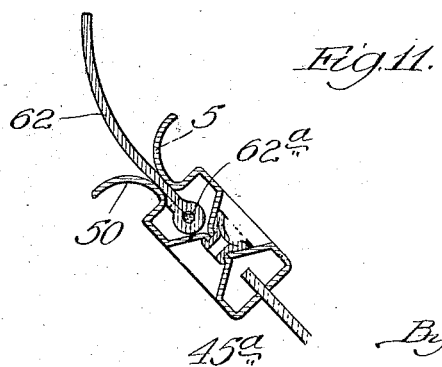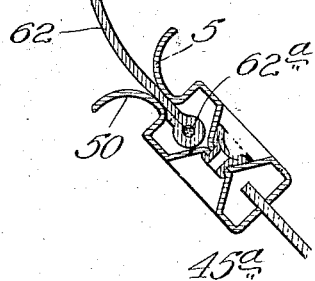

Patented May 25, 1926.

1,586,507

UNITED STATES PATENT OFFICE.

JOHN BERG, OF CHICAGO, ILLINOIS, ASSIGNOR TO METAL SPECIALTIES MANUFACTURING COMPANY, OF CHICAGO, ILLINOIS, A CORPORATION OF ILLINOIS.

VISOR.

Application filed April 21, 1923. Serial No. 633,801.

My invention relates, more particularly, to visors for automobiles; and my primary object is to provide a novel, simple and economical construction of visor which may be readily and securely attached to the frames of wind-shields of automobiles, of different sizes and forms, and which shall present a neat and attractive appearance; another object being to provide a novel, simple and rigid construction of metal frame for use more particularly in supporting the shading portion of the visor, more especially of celluloid.

Referring to the accompanying drawings:

Figure 1 is a broken plan view of a visor structure constructed in accordance with my invention. Figure 2 is a broken view in side elevation of the wind-shield portion of an automobile, showing my improved visor applied to position thereon, two different positions occupied by the visor being represented by full lines and dotted lines respectively. Figure 3 is a front view of a portion of the bracket structure shown in Fig. 2 and the adjacent wind-shield standard to which it is attached. Figure 4 is a section taken at the line 4 on Fig. 3 and viewed in the direction of the arrow. Figure 5 is an enlarged broken section taken at the line 5 on Fig. 2 and viewed in the direction of the arrow; and Figures 6 to 11 inclusive, broken sections taken at the lines 6 to 11 inclusive, respectively, on Fig. 1 and viewed in the direction of the respective arrows.

In the particular construction shown one of the similar wind-shield standards provided at the opposite sides of an automobile is represented at 12, and at 13 a portion of the top of the automobile, which projects over the wind-shield supported on the standards 12, the front cross-member of the frame of the top 13 being represented at 14.

My improved visor construction is adapted to be supported on the standards 12 through the medium of bracket structures forming parts of the visor construction and located at opposite ends of the main body portion 15 of the visor structure, the body portion of the visor being pivotally mounted adjacent its upper edge to adapt it to be swung into different positions as desired, in which adjusted position it is releasably held.

Each of the bracket structures referred to comprises a clamp device 16 for attachment to the adjacent wind-shield standard 12, the clamp device shown comprising a pair of similar members 17 which flatwise oppose each other and are adapted at the portions 18 at one end thereof to partially embrace the standard 12. The clamp at its opposite end is provided with a pair of hook-shaped screws 19 which are vertically spaced apart and extend at their threaded ends through registering openings in the members 17, the screws 19 being provided with nuts 20 and 21 engaging corresponding faces of the members 17, one of which latter is provided with a tensioning screw 22 screwing therein and bearing at its inner end against the inner surface of the other of the members 17 and through the medium of which the clamp 16 is rigidly secured to the standard 12 in the desired position of vertical adjustment thereon. The bracket structure also comprises a standard 23 of rod form, the upper end of which is laterally offset, as represented at 24. The standard 23 extends at its lower end through, and is secured in, the alining hooks 19 of the clamp. The standard 23 connects, at its upper end, with a rod 25 extending crosswise thereof and toward the center of the wind-shield, the connection between the standard and rod being pivotal, as represented at 26. The rods 25 of the two similar bracket structures and which thus extend in a direction toward each other, form pivotal supports, as hereinafter described, for the body portion 15 of the visor. The bracket structure also comprises a longitudinally split tubular member 27 provided with pairs of opposed lugs 28 and 29 equipped with bolts 30 and 31 adapted, when tightened, to contract the member 27, the pair of lugs 28 being connected at the bolt 30 with a split strap member 32 adapted to be slipped over the lower end of the deflected portion 24 of the standard 23, as shown in Fig. 2, the bolt 30 also serving as a means for tightening this strap about the standard 23. The tubular member 27 cooperates with a rod 33 telescoping at one end therewith, and rotatable therein, the opposite end of this rod being formed with a crank portion 34 terminating in a ball 35 confined in a socket 36 carried by a plate 37 secured to the rear side of the body portion 15 of the visor at an edge thereof, the members 27, 32 and 33 which are duplicated at opposite ends of the body portion 15 of the visor, forming braces therefor.

The pivotal connection of the body portion 15 of the visor with the rods 25, is at U-shaped brackets 38 provided on the upper edge of the frame of the body member 15 adjacent the ends of the latter, these brackets containing apertures 39 through which the rods 25 extend and in which these rods are slidable. The body member 15 is also provided with releasable means at each end thereof for holding the body member 15 and rods 25 against relative movement in a direction lengthwise of the rods, these means, in the particular construction illustrated, involving a U-shape spring clip 40 secured at its cross-piece 41 to the body member 15 and through openings 42 in the spring arms of which the rods 25 extend, the parts being so constructed and arranged, as shown, that the clips 40, in normal position, under their spring tension grip the rods 25 and prevent the sliding movement referred to, but when their spring ends are drawn together, release the friction grip on the rods and permit of adjustment of these rods relative to the body member of the visor.

The body member of the visor, in the particular arrangement shown, is formed of the rectangular marginal frame 43, hereinbefore referred to, and provided with a centrally-located cross-piece 44, and a plate portion 45 formed of sections 45$^a$ and 45$^b$, these sections being preferably of transparent flexible material, as, for example, celluloid, held in position by the frame 43, the latter, and consequently the sections 45$^a$ and 45$^b$, being preferably of reversely-curved form in cross-section as illustrated. Each of the members of the frame 43, which preferably is formed of metal, is composed of a pair of sheet metal strips having portions between which the plate-portion 45 of the visor extends, these members being countersunk at intervals to receive fastening devices extending therethrough and firmly holding the parts of the frame members together.

Referring now to the particular, illustrated, construction of the various frame members, the upper and lower ones thereof, represented at 46 and 47, are each formed of the similarly shaped strips 48 presenting opposing flanges 49 along their inner edges, between which the adjacent edges of the plate portion 45 of the visor extend, the opposite edges of the strips 48 presenting inturned and oppositely curved contacting portions 50 the uppermost one of which, at the lower edge of the frame 43, presenting a rain-gutter-forming portion which serves to carry out to the ends of the visor, water running down the latter. At intervals the strips 48 are struck inwardly, between their edges, as represented at 51, at which portions they are apertured, as represented at 52, to receive hollow rivets 53 clenched into a position in which they seat in these countersunk portions and firmly hold the strips 48 in the position shown in Figs. 8 and 9. The end members 54 and 55 of the frame 43 are each formed of oppositely-facing strips 56 and 57 of channel shape in cross-section between opposing edges of which at the inside of the frame the ends of the sections 45$^a$ and 45$^b$ of the body of the visor extend as in the case of the structure shown in Fig. 9, the flanges at the outside edges of the members 54 and 55 fitting flatwise together. The strips forming the frame members 54 and 55 are secured together at intervals by fastening means, as described of the frame members 46 and 47, the fastening devices located between the ends of these members being represented at 58 and shown as in the form of hollow rivets which extend into, and seat in, countersunk portions 59 of the strips and extend through the ends of the plates 37 to which they are clenched as shown in Fig. 6, whereby the rivets 58 serve not only to hold the strips 56 and 57 together, but also hold the plates 37 in place on the frame. The ends of the members 54 and 55 extend into the adjacent ends of the frame members 46 and 47 at which mutually-overlapping portions these frame members are connected together by striking the metal thereof inwardly from opposite sides to form the interlocked countersunk portions as represented in Fig. 5 in which hollow rivets 60, securing the members together at these points, are secured. The opposite ends of the clenched rivets at the ends of the lower frame member 47 extend into, and seat in, the countersunk portions at opposite sides of the frame, whereas the rivets 60 at the ends of the uppermost frame member 46 extend into, and seat in, the countersunk portions of these members at the upper face of the frame and extend through openings in the clips 38 and 40 against which latter their outer ends are clenched, to hold the frame members and these clips rigidly together, as shown in Fig. 5. The cross member 44, a cross-sectional detail of which is shown in Fig. 7, is formed of oppositely-facing channel strips 61 between the flanges 7 of which the adjacent ends of the sections 45$^a$ and 45$^b$ of the body of the visor extend, as shown in Fig. 7, the strips 61 being held together as explained of the strips 48 in Fig. 8. The ends of the cross-member 44 extend into the frame members 46 and 47 to which they are connected, as explained of the connections between the lower ends of the members 54 and 55 and the ends of the frame member 47.

The upper frame member 46 is preferably provided with a flexible shield portion 62 which extends between the portions 50 at the upper edge of the frame member 46 and extends upwardly into overlapped position with the rear surface of the cross-member 14 of the automobile top, to which it may be secured as by the fastening devices represented at 63, the portion 62 being held on the frame in any suitable way, as by stitching a wire 62ª in the lower edge of the strip which prevents the strip from being pulled out of the frame member 46.

It is desirable in constructions of this general character, especially where the shading material is formed of celluloid, or the like, that provision be made for permitting the shading portion to contract and expand relative to the frame without buckling, this being provided for in the construction illustrated by so shaping the metal strips forming the frame-members that the sections 45ª and 45ᵇ are gripped at their edges very lightly by these strips, it being understood that inasmuch as the opposing strips abut along one edge and also intermediate their edges at the countersunk portions, the strips at their other edges may be caused to extend in any desired spaced relation.

It will be noted from the foregoing that the visor structure as provided is adapted to be readily and quickly applied to automobiles having windshield structures of varying sizes and shapes, and that the body portion 15 of the visor may be tilted to any desired angle and rigidly held in such position by the brace members of which the tubes 27 and rods 33 are parts, by reason of the various adjustments provided, as hereinbefore explained, between the various parts of the structure.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. A device of the character set forth, comprising a visor, supporting standards adjacent the ends of the visor with their upper ends laterally offset, means pivoted to the upper ends of said standards for pivotally supporting the visor, means engaging said standards below said offset portions for supporting said standards, said standards being rotatably adjustable in said last named means, and means for holding said visor in its different positions of adjustment about its pivotal support, comprising a brace formed of sections relatively adjustable lengthwise thereof, one of said sections having universal-joint connection with the visor and a supporting device supported on said standard to be rotatably adjustable thereon and to which the other of said sections is pivoted.

2. A device of the character set forth, comprising a visor, supporting standards adjacent the ends of the visor with their upper ends laterally offset, means pivoted to the upper ends of said standards for pivotally supporting the visor, means engaging said standards below said offset portions for supporting said standards, said standards being rotatably adjustable in said last named means, and means for holding said visor in its different positions of adjustment about its pivotal support, comprising a brace formed of sections relatively adjustable lengthwise thereof, one of said sections being rotatable on the other thereof and presenting a laterally offset portion having universal-joint connection with said visor and a supporting device supported on said standard to be rotatably adjusted thereon and to which the other of said sections is pivoted.

3. A device of the character set forth, comprising a pair of brackets each comprising a standard with its upper end laterally offset, a rod extending at an angle to said standard and pivoted to the offset portion thereof, and means engaging said standard below said offset portion for supporting said standard, said standard being rotatably adjustable on said means, a visor pivotally supported on said rods, and means for holding said visor in its different positions of adjustment about its pivotal support comprising a brace formed of sections relatively adjustable lengthwise thereof, one of said sections having universal-joint connection with the visor and a supporting device supported on said standard to be rotatably adjustable thereon and to which the other of said sections is pivoted.

4. A device of the character set forth, comprising a visor equipped at its upper corners with perforate guide-clips, a pair of standard-rods whose upper ends afford pivots, a pair of pivot-rods provided with perforations engaging said pivots, said pivot-rods slidably engaging said clips, and connecting braces between the lower ends of said standard-rods and the end portions of said visor, each comprising a rod-member having a crank portion joined by ball-and-socket joint to the visor, and a tubular clamping portion telescopically receiving the rod-member and having pivotal connection with the lower end portion of the corresponding standard-rod.

5. A device of the character set forth, comprising a visor equipped at its upper corners with U-shaped clips provided with perforations, a U-shaped spring-clip within one of said first-named clips and having divergent flanges provided with perforations, a pair of standards equipped at their upper ends with laterally extending pivot-rods engaging said perforations, said spring-clip serving normally to prevent longitudinal shifting of said pivot-rods, means for supporting said standards, and adjustable connections between the lower ends of said standards and the end portions of said visor.

6. A visor comprising a celluloid sheet and a frame comprising pairs of U-shaped sheet-metal members having one set of flanges spaced to receive the celluloid sheet freely between them and having another set of flanges engaging each other, the web-portions of said U-shaped members having countersunk embossments which engage each other, and rivets connecting said embossments.

JOHN BERG.